(12) United States Patent
Zhang et al.

(10) Patent No.: US 12,280,452 B1
(45) Date of Patent: Apr. 22, 2025

(54) COLLABORATIVE WELD SEAM TRACKING METHOD BASED ON LASER LINE SCANNING SENSING AND PLATFORM THEREOF

(71) Applicant: Jinan Ruiheng Zhiyuan Intelligent Technology Co., Ltd., Jinan (CN)

(72) Inventors: Chengrui Zhang, Jinan (CN); Yisheng Yin, Jinan (CN)

(73) Assignee: Jinan Ruiheng Zhiyuan Intelligent Technology Co., Ltd., Jinan (CN)

( * ) Notice: Subject to any disclaimer, the term of this patent is extended or adjusted under 35 U.S.C. 154(b) by 0 days.

(21) Appl. No.: 18/961,487

(22) Filed: Nov. 27, 2024

(30) Foreign Application Priority Data

Jan. 4, 2024 (CN) .......................... 202410022167.1

(51) Int. Cl.
 *B23K 31/12* (2006.01)
 *G01N 21/39* (2006.01)
 *G01N 21/892* (2006.01)
(52) U.S. Cl.
 CPC ........... *B23K 31/125* (2013.01); *G01N 21/39* (2013.01); *G01N 21/892* (2013.01)

(58) Field of Classification Search
 CPC ..... B23K 31/125; G01N 21/39; G01N 21/892
 See application file for complete search history.

(56) References Cited

U.S. PATENT DOCUMENTS

2023/0211437 A1\* 7/2023 Tanaka .................. B23K 37/04
 219/121.63

\* cited by examiner

*Primary Examiner* — Jamil Ahmed

(57) ABSTRACT

A collaborative seam tracking method based on laser line scanning sensing includes: scanning, by using a laser line scanning sensor, a weld seam to obtain an original sampling deviation value; coordinate converting the original sampling deviation value to obtain a converted sampling deviation value, and then obtaining a first converted sampling deviation coordinate based on a current position coordinate of a motion mechanism; in response to an absolute difference between the converted sampling deviation value and a position value of a corresponding projection point on a preset path is less than a processing range of a galvanometer, performing a seam tracking; in response to the absolute difference between the converted sampling deviation value and the position value of the corresponding projection point on the taught path is greater than or equal to the processing range, performing Hermite interpolation, thereby obtaining an interpolation function as a motion trajectory.

10 Claims, 5 Drawing Sheets

COLLABORATIVE WELD SEAM TRACKING METHOD BASED ON LASER LINE SCANNING SENSING AND PLATFORM THEREOF

CROSS-REFERENCE TO RELATED APPLICATION

This application claims priority to Chinese Patent Application No. 202410022167.1, filed Jan. 4, 2024, which is herein incorporated by reference in its entirety.

TECHNICAL FIELD

The disclosure relates to the technical field of laser beam welding, and particularly to a collaborative weld seam tracking method based on laser line scanning sensing and a platform thereof.

BACKGROUND

Weld seam tracking is a major trend in the development of intelligent robotic welding technology. It typically involves combining a laser scanning sensor with an end-effector of a robot, the welding torch, to project a strip of laser onto a workpiece with a weld seam. The laser line scanning sensor captures a deviation of the weld seam sampling points and stores the deviation in a data buffer for subsequent compensation in the robot's motion, allowing the welding torch to follow a movement of the weld seam. However, considering the various shapes of weld seam trajectories, there are inevitably sharp changes in direction such as large curvatures or corner weld seams. Due to the motion mechanism with a large mass and inertia, and rapid acceleration and deceleration through corners can cause significant impact and time loss.

To address the above problems, a galvanometer can be combined with a motion mechanism. Utilizing laser oscillation welding technology, the deflection of the galvanometer is precisely controlled to direct the laser beam. After being deflected at a small angle by the galvanometer, the beam is focused onto the workpiece surface through a focusing lens, creating a specific oscillation trajectory. This trajectory can be adjusted arbitrarily within a certain range. However, since laser oscillation welding only performs a specific oscillation trajectory and a oscillation angle limit results in a smaller processing range for the galvanometer, when a large curvature or a corner weld seam deviate significantly from the motion direction of the motion mechanism, it is not possible to reach the weld seam position with the deflection of the galvanometer mirror alone.

Therefore, researching an effective collaborative weld seam tracking method to maximize the use of the galvanometer and motion mechanism is the key issue currently intended to be resolved.

SUMMARY

To solve the above problems in the related art, the disclosure provides a collaborative weld seam tracking method based on a laser line scanning sensing and a platform thereof.

A collaborative weld seam tracking method based on laser line scanning sensing includes:
during a welding process, implementing the following steps:
scanning, by using a laser line scanning sensor, a weld seam to obtain an original sampling deviation value;
coordinate converting the original sampling deviation value to obtain a converted sampling deviation value, and then obtaining a first converted sampling deviation coordinate based on a current position coordinate of a motion mechanism;
in response to an absolute difference between the converted sampling deviation value and a position value of a projection point of the converted sampling deviation value on a preset path is less than a processing range of the galvanometer, performing, by the galvanometer mirror, a weld seam tracking on the weld seam; and
in response to the absolute difference between the converted sampling deviation value and the position value of the projection point on of the converted sampling deviation value on the preset path is greater than or equal to the processing range of the galvanometer, performing Hermite interpolation using the current position coordinate of the motion mechanism, the first converted sampling deviation coordinate, a corner point coordinate corresponding to a maximum sampling deviation coordinate of the weld seam, an endpoint coordinate of the weld seam, a motion ending point coordinate of the motion mechanism, a derivative of the current position coordinate of the motion mechanism, a derivative of the first converted sampling deviation coordinate, a derivative of the corner point coordinate corresponding to the maximum sampling deviation coordinate of the weld seam, a derivative of the endpoint coordinate of the weld seam, and a derivative of the motion ending point coordinate of the motion mechanism as interpolation points, thereby obtaining an interpolation function as a motion trajectory of the motion mechanism.

In an embodiment, before the welding process, the collaborative weld seam tracking method includes:
sequentially disposing the laser line scanning sensor and the galvanometer along a welding direction on the motion mechanism configured for welding the weld seam;
setting a data buffer, and determining the processing range based on a processing area of the galvanometer; and
setting a motion starting point of the motion mechanism and a motion ending point of the motion mechanism along the welding direction.

In an embodiment, the sequentially disposing the laser line scanning sensor and the galvanometer along a welding direction on the motion mechanism configured for welding the weld seam includes: disposing the laser line scanning sensor to make a laser scanning beam of the laser line scanning sensor ahead of the galvanometer by a first distance along the welding direction, setting a measurement range of the laser line scanning sensor, calibrating the laser line scanning sensor and adjusting the laser scanning beam of the laser line scanning sensor to make the weld seam being in the measurement range of the laser line scanning sensor. The first distance is greater than a mapping distance of the weld seam, and the mapping distance is a maximum value of projected lengths of multiple weld seam segments contained in the weld seam in the welding direction.

In an embodiment, the scanning, by using a laser line scanning sensor, a weld seam to obtain an original sampling deviation value of the weld seam further includes:
storing the original sampling deviation value in the data buffer, as updated data;

determining the updated data as a valid data, in response to the updated data in the data buffer being in the measurement range of the laser line scanning sensor;

determining the updated data as an invalid data, in response to the updated data in the data buffer being beyond the measurement range of the laser line scanning sensor;

determining that scanning of one seam segment of the weld seam has started, in response to multiple valid data being continuously stored the data buffer;

determining that scanning of the one weld segment of the weld seam has finished, in response to multiple invalid data being continuously stored in the data buffer, and labeling the one seam segment.

In an embodiment, the coordinate converting the original sampling deviation value to obtain a converted sampling deviation value, and then obtaining a first converted sampling deviation coordinate based on a current position coordinate of a motion mechanism includes:

obtaining a sampling deviation value in a coordinate system of the motion mechanism and a positional value corresponding to the sampling deviation value as the first converted sampling deviation coordinate, where the sampling deviation value in the coordinate system of the motion mechanism is obtained through a formula expressed as follows:

$$Y_{trans} = Y_{ori} + Y_{offset} + Y_{plat} \quad (1)$$

where $Y_{trans}$ represents the sampling deviation value in the coordinate system of the motion mechanism, $Y_{ori}$ represents the original sampling deviation value, which is a deviation of an intersection point of a laser scanning beam from the laser line scanning sensor and the weld seam with respect to a center point of the laser scanning beam from the laser line scanning sensor, $Y_{offset}$ represents an offset distance of the laser line scanning sensor from the galvanometer, and $Y_{plat}$ represents a Y value of the current position coordinate of the motion mechanism;

where the positional value corresponding to the sampling deviation value is obtained through a formula expressed as follows:

$$X_{trans} = X_{offset} + X_{plat} \quad (2)$$

where $X_{trans}$ represents the positional value corresponding to the sampling deviation value $Y_{trans}$, $X_{offset}$ represents a distance of the laser line scanning sensor relative to the galvanometer, and $X_{plat}$ represents an X value of the current position coordinate of the motion mechanism.

In an embodiment, the preset path is a straight-line path between the motion starting point and the motion ending point.

In an embodiment, the performing, by the galvanometer, a weld seam tracking on the weld seam includes:

calculating the motion trajectory of a center point of the galvanometer according to a formula expressed as follows:

$$Y_{scan} = Y_{trans\text{-}plat} - Y_{plat} \quad (3)$$

where $Y_{scan}$ represents an offset value of the center point of the galvanometer from an origin point of the galvanometer, $Y_{trans\text{-}plat}$ represents a sampling deviation value corresponding to a positional value $X_{trans\text{-}plat}$ in the data buffer, the positional value $X_{trans\text{-}plat}$ represents a position value closest to the X value $X_{plat}$ of the current position coordinate of the motion mechanism, and $Y_{plat}$ represents the Y value of the current position coordinate of the motion mechanism.

In an embodiment, the performing Hermite interpolation using the current position coordinate of the motion mechanism, the first converted sampling deviation coordinate, a corner point coordinate corresponding to a maximum sampling deviation coordinate of the weld seam, an endpoint coordinate of the weld seam, a motion ending point coordinate of the motion mechanism, and a derivative of the current position coordinate of the motion mechanism, a derivative of the first converted sampling deviation coordinate, a derivative of the corner point coordinate corresponding to the maximum sampling deviation coordinate of the weld seam, a derivative of the endpoint coordinate of the weld seam, and a derivative of the motion ending point coordinate of the motion mechanism as interpolation points, thereby obtaining an interpolation function as a motion trajectory includes:

after the motion mechanism motion mechanism starts moving, using the current position coordinate of the motion mechanism, the derivative of the current position coordinate, the first converted sampling deviation coordinate, and the derivative of the first converted sampling deviation coordinate as first interpolation points, and then performing Hermite interpolation to obtain a first local continuous cubic interpolation function, and using the first local continuous cubic interpolation function as the motion trajectory of the motion mechanism for a current phase;

when the motion mechanism reaches the first converted sampling deviation coordinate, using the first converted sampling deviation coordinate, the derivative of the first converted sampling deviation coordinate, the endpoint coordinate of the weld seam, the derivative of the endpoint coordinate of the weld seam, the corner point coordinate corresponding to the maximum sampling deviation coordinate of the weld seam, and the derivative of the corner point coordinate corresponding to the maximum sampling deviation coordinate of the weld seam as second interpolation points, and then performing Hermite interpolation based on the second interpolation points to obtain a local continuous quintic interpolation function, and using the local continuous quintic interpolation function as the motion trajectory of the motion mechanism for the current phase;

when the motion mechanism reaches the endpoint coordinate of the weld seam, using the endpoint coordinate of the weld seam, the derivative of the endpoint coordinate of the weld seam, the motion ending point coordinate of the motion mechanism, and the derivative of the motion ending point coordinate of the motion mechanism as third interpolation points, and then performing Hermite interpolation based on the third interpolation points to obtain a second local continuous cubic interpolation function, and using the second local continuous in cubic interpolation function as the motion trajectory of the motion mechanism for a current phase.

The first converted sampling deviation coordinate refers to a latest converted sampling deviation coordinate in the data buffer at a current moment, and the corner point coordinate corresponding to the maximum sampling deviation coordinate of the weld seam refers to a coordinate obtained by subtracting the processing range of the galvanometer from the maximum sampling deviation coordinate.

In an embodiment, the corresponding motion trajectories of the center point of the galvanometer are obtained based on the first local continuous cubic interpolation function, the local continuous quintic interpolation function, and the second local continuous cubic interpolation function, respectively.

In an embodiment, a collaborative weld seam tracking platform based on laser line scanning sensing includes a laser line scanning sensor, an industrial control computer, a motion mechanism, a galvanometer, and a fiber laser. The fiber laser is configured to generate a laser beam and transmit the laser beam to the galvanometer through an optical fiber. The galvanometer is connected to an end of the motion mechanism and is positioned ahead of the motion mechanism along a welding direction. The laser line scanning sensor is located in front of the galvanometer, is configured to collect weld seam deviation values at a pre-set sampling frame rate and send the weld seam deviation values to the industrial control computer. The industrial control computer is configured to calculate tracking control quantities based on a weld seam tracking strategy. After the calculation is completed, the industrial control computer is configured to send the tracking control quantities to the motion mechanism and the galvanometer to achieve coordinated tracking control of the motion mechanism and the galvanometer.

Compared to the related art, the benefits of the disclosure are as follows.

(1) In the disclosure, for one seam segment of the weld seam or multiple seam segments of the weld seam, it is only necessary to specify the motion starting point and the motion ending point of the motion mechanism (the weld seam). By using a laser line scanning sensor, collaborative weld seam tracking is achieved between the motion mechanism and the galvanometer for the weld seam.

(2) In the disclosure, a laser line scanning sensor is used for online weld seam tracking. For the case where the motion mechanism passes over a small range of the weld seam, that is, when the weld seam deviation is within the processing range of the galvanometer, it is proposed to use the galvanometer for weld seam tracking.

(3) In the disclosure, a laser line scanning sensor is used for the online weld seam tracking. When the weld seam deviate significantly from the motion direction of the motion mechanism and the weld seam deviation is beyond the processing range of the galvanometer, it is proposed to use the motion mechanism and the galvanometer for the collaborative weld seam tracking. This is especially beneficial when dealing with the weld seam with large curvatures or corners, as it reduces the significant impact on the motion mechanism caused by abrupt changes in direction.

BRIEF DESCRIPTION OF DRAWINGS

The attached drawings, which form a part of the disclosure, are used to provide further understanding of the disclosure. The illustrative embodiments and their explanations of the disclosure are used to explain the p disclosure and do not constitute undue limitation of the disclosure.

DETAILED DESCRIPTION OF EMBODIMENTS

It should be noted that the embodiments and features in the embodiments of the disclosure can be combined with each other without conflict. Below, the disclosure will be described in detail with reference to the attached drawings and in conjunction with embodiments.

It should be noted that the steps shown in the flowchart can be executed in a computer system such as a set of computer executable instructions, and although the logical order is shown in the flowchart, in some cases, the steps shown or described may be executed in a different order than here.

Embodiment 1

Figure 1:
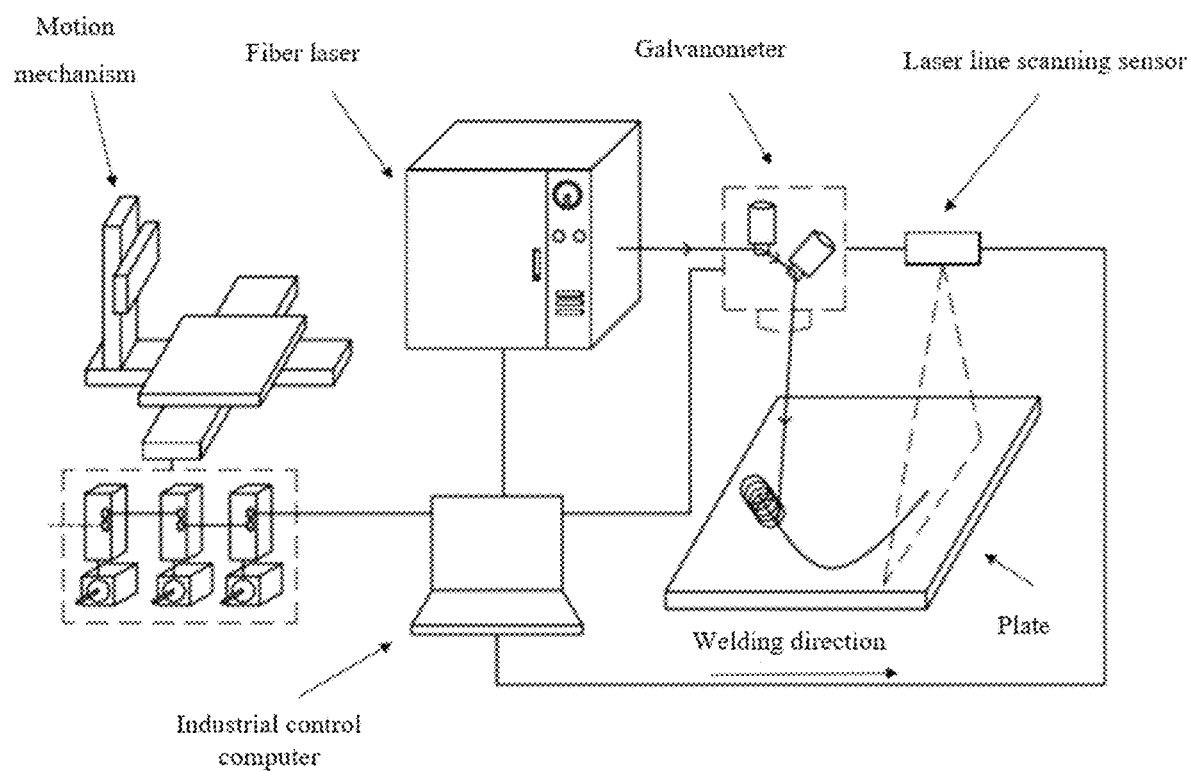
FIG. 1 illustrates a schematic diagram of a platform for an online weld seam tracking in an embodiment of the disclosure.
Figure 2:
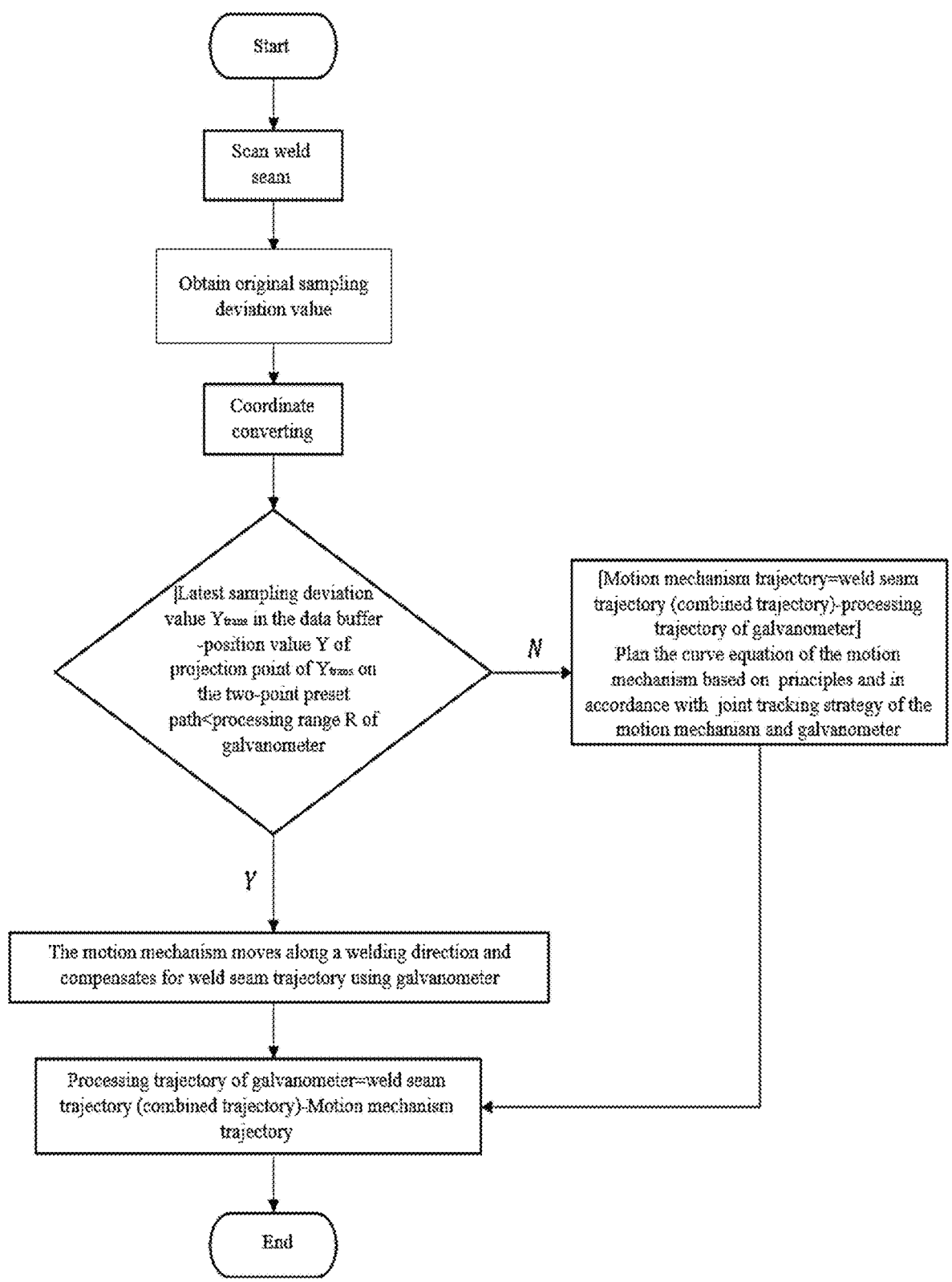
FIG. 2 illustrates a flowchart of a strategy for the online weld seam tracking in the embodiment of the disclosure.

As shown in FIG. 1 and FIG. 2, a collaborative weld seam tracking method based on laser line scanning sensing and a platform thereof are provided.

As shown in FIG. 1, a collaborative weld seam tracking platform based on laser line scanning sensing includes a laser line scanning sensor, an industrial control computer, a motion mechanism, a galvanometer, and a fiber laser. From FIG. 1, the fiber laser is configured to generate a laser beam and transmit the laser beam to the galvanometer through an optical fiber. The galvanometer is connected to an end of the motion mechanism and is positioned ahead of the motion mechanism along a welding direction. The laser line scanning sensor is located in front of the galvanometer, and the galvanometer is configured to collect weld seam deviation values at a pre-set sampling frame rate and send the weld seam deviation values to the industrial control computer. The industrial control computer is configured to calculate tracking control quantities based on a weld seam tracking strategy. After the calculation is completed, the industrial control computer is configured to send the tracking control quantities to the motion mechanism and the galvanometer to achieve coordinated tracking control of the motion mechanism and the galvanometer.

Figure 3:
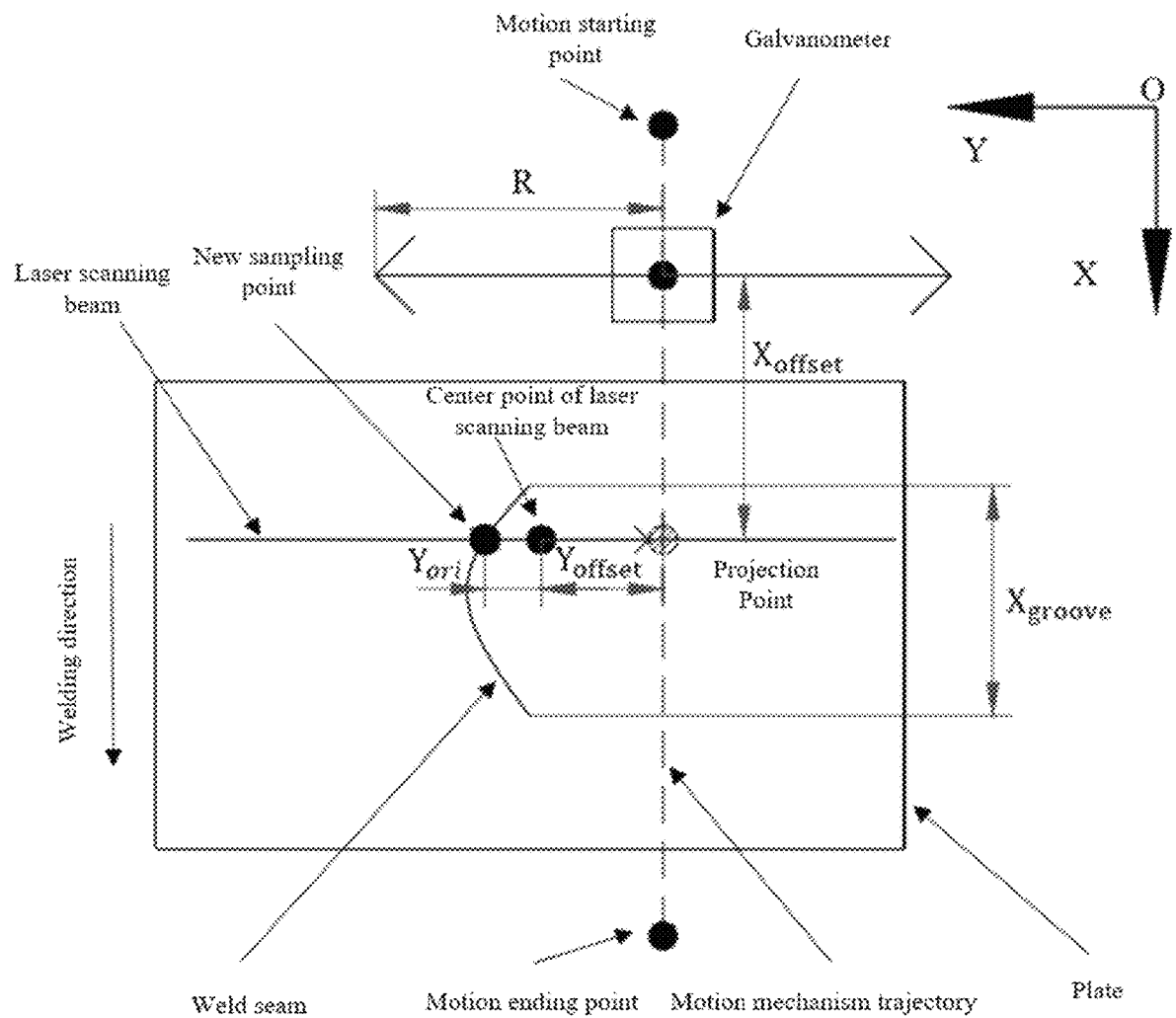
FIG. 3 illustrates a schematic diagram of a motion trajectory of a motion mechanism in an embodiment of the disclosure.
Figure 4:
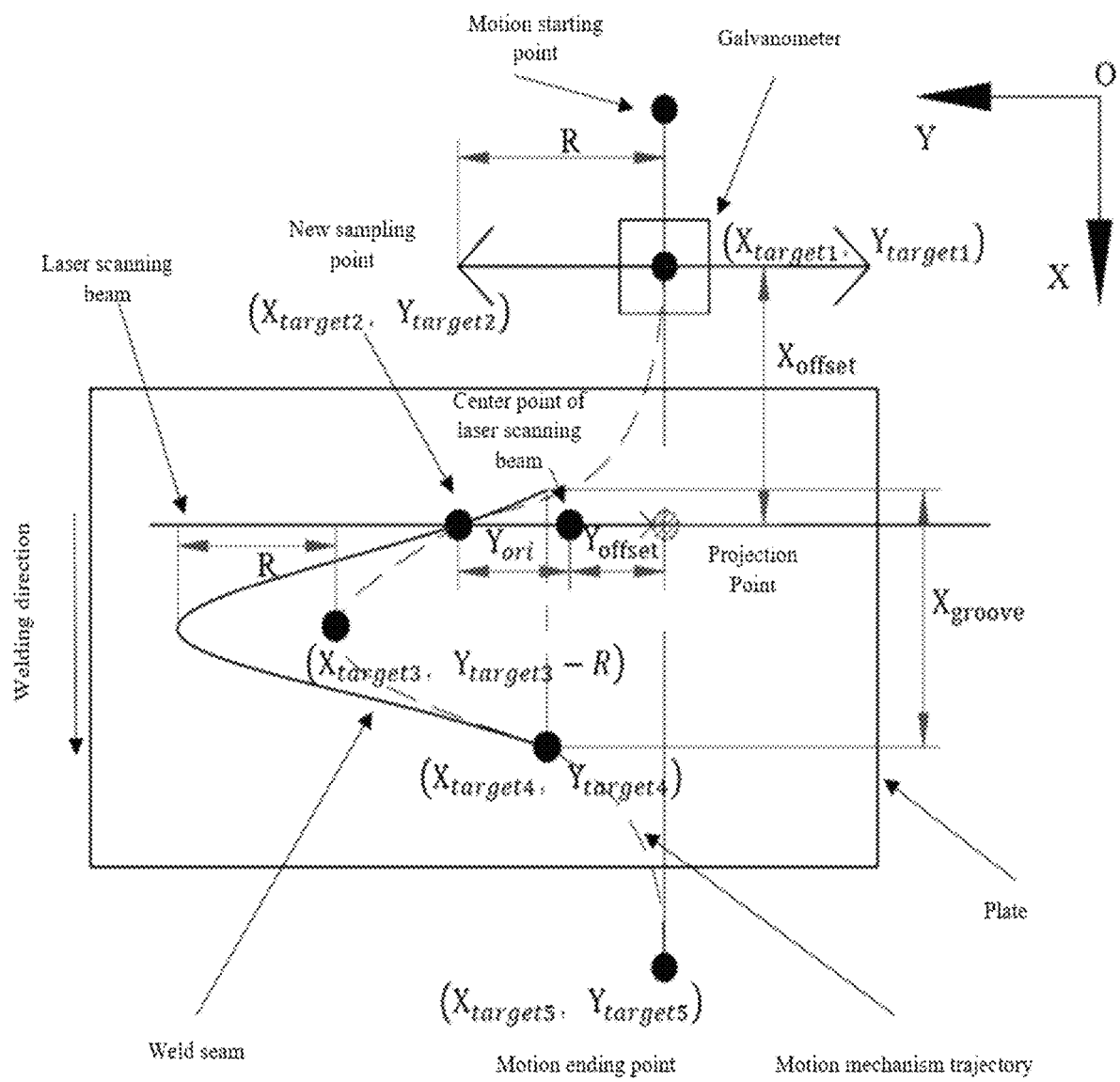
FIG. 4 illustrates another schematic diagram of the motion trajectory of the motion mechanism in an embodiment of the disclosure.

As shown in FIGS. 2-4, a collaborative seam tracking method based on laser line scanning sensing includes steps 1-8 as follows.

In step 1, a galvanometer and a laser line scanning sensor are installed on a motion mechanism, and it should be ensured that a laser scanning beam is ahead of an origin of the galvanometer by a distance along the welding direction. The distance should exceed a mapping distance of a seam segment of the weld seam. After installation, the laser line scanning sensor is turned on, a measurement range of the laser line scanning sensor is set, and a calibration work for the laser line scanning sensor is performed. After the calibration, a positional offset $(X_{offset}, Y_{offset})$ of the laser line scanning sensor relative to the galvanometer is obtained, and then the laser scanning beam of the laser line scanning sensor is adjusted so that the weld seam is within the measurement range of the laser scanning beam of the laser line scanning sensor.

Specifically, the mapping distance refers to a maximum value of the projected lengths of weld seam segments contained in the weld seam in the welding direction. It should be ensured that a distance of the laser line scanning sensor relative to the galvanometer is greater than the mapping distance, that is, $X_{offset} > X_{groove}$.

In step 2, a data buffer is set in an industrial control computer, and a size of the data buffer is allocated based on the distance of the laser line scanning sensor relative to the galvanometer and a sampling frame rate of the laser line scanning sensor.

In step 3, a processing range R of the galvanometer is set based on its processing area.

In step 4, a motion starting point of the motion mechanism and a motion ending point of the motion mechanism are set along the welding direction.

In step 5, after the step 4, a welding process begins with the motion mechanism moving along the welding direction. The laser line scanning sensor performs scanning and acquires data (original sampling deviation value), which is then updated in the data buffer.

Specifically, the updated data is determined as a valid data, in response to the updated data in the data buffer being in the measurement range of the laser line scanning sensor. The updated data is determined as an invalid data, in response to the updated data in the data buffer being beyond the measurement range of the laser line scanning sensor. It is determined that scanning of one seam segment of the weld seam has started, in response to multiple valid data being continuously stored the data buffer. It is determining that scanning of the one weld segment of the weld seam has finished, in respond to multiple invalid data being continuously stored in the data buffer, and the one seam segment is labeled.

In step 6, an original sampling deviation value $Y_{ori}$ is obtained by using the laser line scanning sensor. Since the original sampling deviation value $Y_{ori}$ is based on a current position of the motion mechanism, it is necessary to transform the original sampling deviation value $Y_{ori}$ into a coordinate system of the motion mechanism, and record the current position of the motion mechanism $X_{trans}$. The processed sampling deviation coordinate ($X_{trans}$, $Y_{trans}$) is stored in the data buffer created in the step 2.

Specifically, the original sampling deviation value $Y_{ori}$ obtained by using the laser line scanning sensor is a deviation of an intersection point of a laser scanning beam from the laser line scanning sensor and the weld seam with respect to a center point of the laser scanning beam from the laser line scanning sensor. The laser line scanning sensor communicates with the industrial control computer. After receiving the data, the industrial control computer converts the deviation to the coordinate system of the motion mechanism based on the current position ($X_{plat}$, $Y_{plat}$) of the motion mechanism. That is, the sampling deviation coordinate ($X_{trans}$, $Y_{trans}$) is obtained according to formulas (1) and (2) through the industrial control computer and is stored in the data buffer.

$$Y_{trans} = Y_{ori} + Y_{offset} + Y_{plat} \qquad \text{formula (1)}$$

$$X_{trans} = X_{offset} + X_{plat} \qquad \text{formula (2)}$$

In step 7, after the motion mechanism starts moving from the motion starting point of the motion mechanism, the data buffer updates the data. The updated data in the data buffer is evaluated to obtain a latest sampling deviation value $Y_{trans}$ (converted sampling deviation value). As shown in FIG. 3, when an absolute difference between the latest sampling deviation value $Y_{trans}$ and a position value Y of a projection point of the latest sampling deviation value $Y_{trans}$ on the two-point preset path is less than the processing range R of the galvanometer, a welding travel between the position value $X_{trans}$ corresponding to the latest sampling deviation value $Y_{trans}$ and the current position coordinate value $X_{plat}$ of the motion mechanism can be achieved by using only the galvanometer for the seam tracking.

Specifically, the preset path is a straight-line path between the motion starting point and the motion ending point. If all sampling deviation values are within the processing range of the galvanometer, there is no need for the motion mechanism to perform welding tracking. In this case, the motion trajectory of a center point of the galvanometer center point used for seam tracking is calculated using the following formula (3).

$$Y_{scan} = Y_{trans\text{-}plat} - Y_{plat} \qquad \text{formula (3)}$$

In step 8, as shown in FIG. 4, when the absolute difference between the latest sampling deviation value $Y_{trans}$ in the data buffer and the position value Y of the projection point of the latest sampling deviation value $Y_{trans}$ on the two-point preset path is greater than or equal to the processing range R of the galvanometer, the current position coordinate of the motion mechanism ($X_{target1}$, $Y_{target1}$) is recorded, and the latest sampling deviation coordinate in the data buffer ($X_{target2}$, $Y_{target2}$) is recorded. The current position coordinate ($X_{target1}$, $Y_{target1}$) and its derivative, the latest sampling deviation coordinate ($X_{target2}$, $Y_{target2}$) and its derivative are taken as interpolation points. Hermite interpolation is performed to obtain a local continuous cubic interpolation function. The local continuous cubic interpolation function is the motion trajectory of the motion mechanism. The motion trajectory of the oscillating center point of galvanometer can be determined based on the difference between the weld seam trajectory and the motion trajectory of the motion mechanism. Since the distance of the laser line scanning sensor exceeds the mapping distance of the weld seam, by the time the motion mechanism reaches the point ($X_{target2}$, $Y_{target2}$) the laser line scanning sensor has already scanned the corner point and the end point of the weld seam. The maximum value $Y_{max}$ of the sampling deviation values $Y_{trans}$ is traversed in the data buffer for the seam segment of the weld seam, and the coordinate of the corner point as ($X_{target3}$, $Y_{target3}$) is recorded. The coordinate of the end point of the seam segment of the weld seam as ($X_{target4}$, $Y_{target4}$) is recorded. The points ($X_{target2}$, $Y_{target2}$), ($X_{target3}$, $Y_{target3}$-R), and ($X_{target4}$, $Y_{target4}$) and their derivatives are taken as second interpolation points. The Hermite interpolation is performed to obtain a local continuous quintic interpolation function. The local continuous quintic interpolation function is the motion trajectory of the motion mechanism. The motion trajectory of the oscillating center point of the galvanometer can be determined based on the difference between the weld seam trajectory and the motion trajectory of the motion mechanism. When the motion mechanism reaches the point ($X_{target4}$, $Y_{target4}$), the point ($X_{target4}$, $Y_{target4}$) and its derivative, and the ending point ($X_{target5}$, $Y_{target5}$) and its derivative are taken as third interpolation points. The Hermite interpolation is performed to obtain a second local continuous cubic interpolation function. The second local continuous cubic interpolation function is the motion trajectory of the motion mechanism for a current phase. Specifically, if there are sampling deviation values beyond the processing range of the galvanometer, it is not possible to track the weld seam using only the galvanometer. In this case, the motion mechanism also needs to move in the Y direction, and it is necessary to ensure that the oscillating center point of the galvanometer can always reach the weld seam point during the motion of the motion mechanism. The Hermite interpolation polynomials are used to calculate the motion trajectories of multiple segments of the motion mechanism.

In the embodiment, for a single weld segment or multiple weld segments of the weld seam, it is only necessary to specify a motion starting point and a motion ending point of the weld seam. By utilizing a laser line scanning sensor, collaborative seam tracking is achieved between the motion mechanism and the galvanometer for the weld seam.

In the embodiment, the laser line scanning sensor is used for online seam tracking. For the case where the motion mechanism passes over a small range of the weld seams, that is, when the weld seam deviation is within the processing range of the galvanometer, it is proposed to use the galvanometer for the weld seam tracking.

In the embodiment, the laser line scanning sensor is used for online seam tracking. When the weld seam deviates significantly from the motion direction of the motion mechanism and the weld seam deviation is beyond the processing range of the galvanometer, it is proposed to use the motion mechanism and the galvanometer for collaborative weld seam tracking. This is especially beneficial when dealing with the weld seams with large curvatures or corners, as it reduces the significant impact on the motion mechanism caused by abrupt changes in direction.

The laser line scanning sensor include lasers, collimators, scanning s, photodetectors, and data processing systems, which are used to detect and measure surface features of objects. The disclosure does not limit this and only requires the corresponding functions to be executed.

The industrial control computer is a computer system designed specifically for industrial environments. It is commonly used for controlling and monitoring industrial equipment and processes. The disclosure does not limit this and only requires the corresponding functions to be executed.

The motion mechanism includes servo motors, transmission systems, etc., and is used to achieve mechanical motion. The disclosure does not limit this and only requires the corresponding functions to be executed.

The galvanometer is an optical device used to control the direction of a laser beam. The disclosure does not limit this and only requires the corresponding functions to be executed.

The fiber laser refers to a laser that uses rare earth element doped glass fiber as a gain medium. The disclosure does not limit this and only requires the corresponding functions to be executed.

Embodiment 2

The embodiment has the implementation content of the above embodiment 1, where the specific implementation method of the above embodiment can refer to the above description, and the embodiment here will not be repeated in detail. In the embodiment, the difference from the above embodiment is that the embodiment 3 further includes steps 9 and 10.

Steps 1 to 8 of the embodiment 2 are similar to the steps 1-8 of the embodiment 1 and will not be repeated in detail here.

Figure 5:
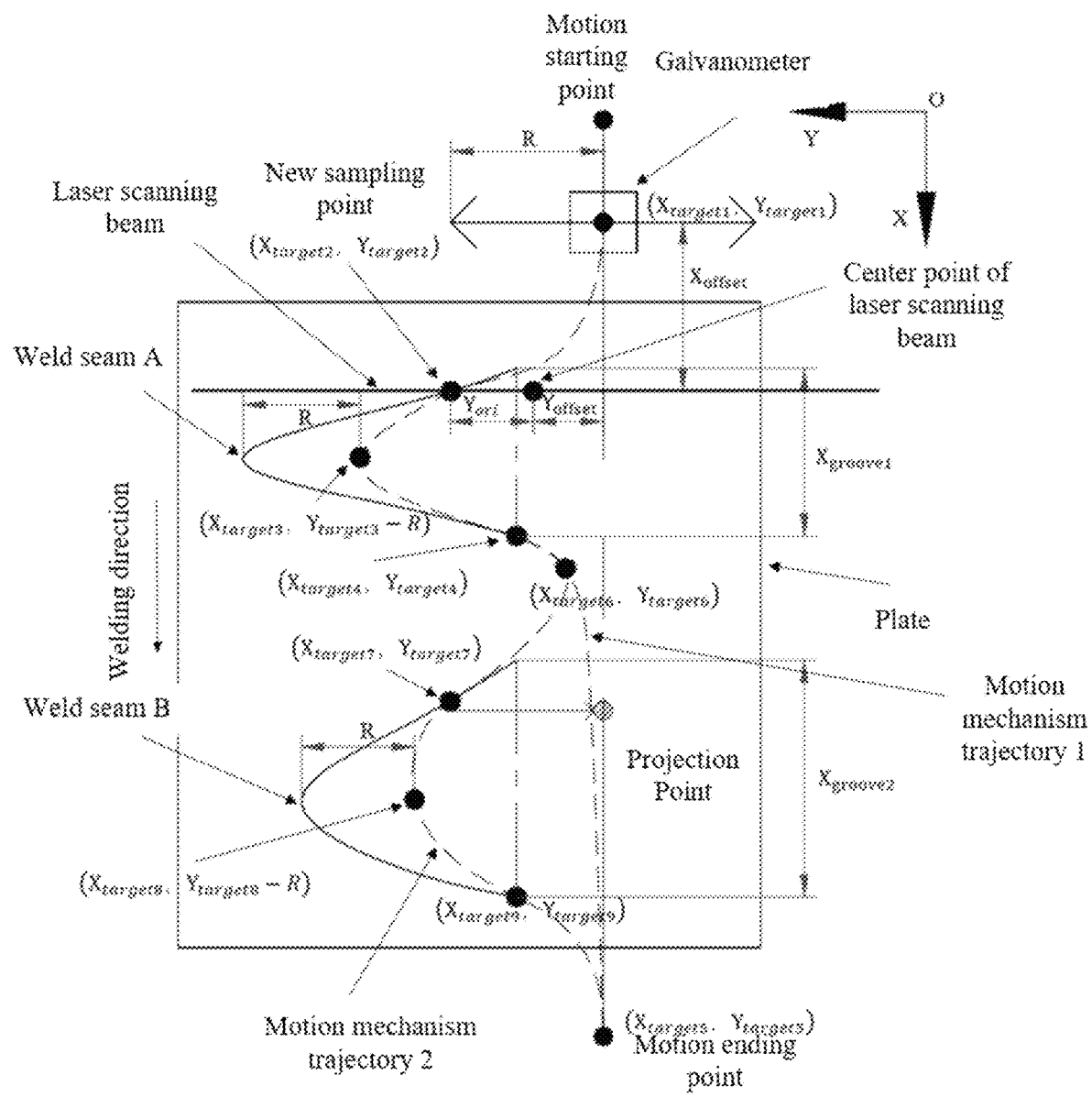
FIG. 5 illustrates a schematic diagram of the motion trajectory of the motion mechanism for multiple seam segments of the weld seam in the embodiment of the disclosure.

In step 9, as shown in FIG. 5, when the motion mechanism reaches the point $(X_{target4}, Y_{target4})$, it sequentially queries the data updated in the data buffer after $(X_{target4}, Y_{target4})$. If all are invalid data or there is data for the next seam segment of the weld seam, but the absolute difference between the sampling deviation value $Y_{trans}$ and the position value Y of the projection point of the sampling deviation value $Y_{trans}$ on the preset path is less than the processing range R of the galvanometer, then the point $(X_{target4}, Y_{target4})$ and its derivative, the motion ending point $(X_{target5}, Y_{target5})$ and its derivative are taken as interpolation points. The Hermite interpolation is performed to obtain a local continuous cubic interpolation function, which is a motion trajectory 1 of the motion mechanism. When the motion mechanism passes a point $(X_{target6}, Y_{target6})$ on the motion trajectory 1, and the absolute difference between the latest sampling deviation value $Y_{trans}$ in the data buffer and the position value Y of the projection point of the latest sampling deviation value $Y_{trans}$ on the preset path is greater than or equal to the processing range R of the galvanometer, then the latest sampling deviation coordinate in the data buffer $(X_{target7}, Y_{target7})$ is recorded. The point $(X_{target6}, Y_{target6})$ and its derivative, the point $(X_{target7}, Y_{target7})$ and its derivative are taken as the interpolation points. The Hermite interpolation is performed to obtain another local continuous cubic interpolation function, which is the motion trajectory 2 of the motion mechanism. The motion trajectory of the oscillating center point of the galvanometer can be determined based on the difference between the weld seam trajectories and the motion trajectory of the motion mechanism. When the motion mechanism reaches the point $(X_{target7}, Y_{target7})$, the subsequent process is the same as the step 8 in embodiment 1, until the motion ending point is reached.

In step 10, when the motion mechanism reaches the point $(X_{target4}, Y_{target4})$, it sequentially queries the data updated in the data buffer after $(X_{target4}, Y_{target4})$. If there is data for the next seam segment of the weld seam, and from a certain point, the absolute difference between the sampling deviation value $Y_{trans}$ and the position value Y of the projection point of the sampling deviation value $Y_{trans}$ on the preset path is greater than or equal to the processing range R of the galvanometer, then the sampling deviation coordinate of the point $(X_{target7}, Y_{target7})$ is recorded. The point $(X_{target4}, Y_{target4})$ and its derivative, the point $(X_{target7}, Y_{target7})$ and its derivative are taken as the interpolation points. The Hermite interpolation is performed to obtain a local continuous cubic interpolation function, which is the motion trajectory of the motion mechanism. The motion trajectory of the oscillating center point of the galvanometer can be determined based on the difference between the weld seam trajectory and the motion trajectory of the motion mechanism. When the motion mechanism reaches the point $(X_{target7}, Y_{target7})$, the subsequent process is the same as the step 8 in the embodiment 1, until the motion ending point is reached.

Embodiment 3

A collaborative seam tracking method based on laser line scanning sensing includes steps as follows.

During a welding process, a laser line scanning sensor is used to scan a weld seam to obtain an original sampling deviation value. The original sampling deviation value is coordinate converted to obtain a converted sampling deviation value, and then a first converted sampling deviation coordinate is obtained based on a current position coordinate of a motion mechanism. In response to an absolute difference between the converted sampling deviation value and a position value of a projection point of the converted sampling deviation value on a preset path is less than a processing range of a galvanometer, a seam tracking is performed based on the galvanometer mirror; or in respond to the absolute difference between the converted sampling deviation value and the position value of the projection point of the converted sampling deviation value on the preset path is greater than or equal to the processing range of the galvanometer, Hermite interpolation is performed by using the current position coordinate of the motion mechanism, the first converted sampling deviation coordinate, a corner point coordinate corresponding to a maximum sampling deviation coordinate in the weld seam, an endpoint coordinate of the weld seam, a motion ending point coordinate of the motion mechanism, a derivative of the current position coordinate of the motion mechanism, a derivative of the first converted sampling deviation coordinate, a derivative of the corner point coordinate corresponding to the maximum sampling deviation coordinate of the weld seam, a derivative of the endpoint coordinate of the weld seam, and a derivative of the motion ending point coordinate of the motion mechanism as interpolation points, thereby obtaining an interpolation function as a motion trajectory of the motion mechanism.

In the embodiment, before the welding process, the collaborative weld seam tracking method includes the following steps. The laser line scanning sensor and the galvanometer are sequentially disposed along a welding direction on the motion mechanism configured for welding the weld seam. A data buffer is set, and a processing range is determined based on a processing area of the galvanometer. A motion starting point of the motion mechanism and a motion ending point of the motion mechanism are set along the welding direction.

In the embodiment, the sequentially disposing the laser line scanning sensor and the galvanometer along a welding direction on the motion mechanism configured for welding the weld seam includes steps as follows. The laser line scanning sensor is disposed to make a laser scanning beam of the laser line scanning sensor ahead of the galvanometer by a first distance along the welding direction, a measurement range of the laser line scanning sensor is set, the laser line scanning sensor is calibrated, and followed by adjusting the laser scanning beam of the laser line scanning sensor to make the weld seam being in the measurement range of the laser line scanning sensor. The first distance is greater than a mapping distance of the weld seam, and the mapping distance is a maximum value of projected lengths of multiple weld seam segments contained in the weld seam in the welding direction.

In the embodiment, the scanning, by using a laser line scanning sensor, a weld seam to obtain an original sampling deviation value of the weld seam further includes steps as follows. The original sampling deviation value is stored in the data buffer as updated data. The updated data is determined as a valid data, in response to the updated data in the data buffer being in the measurement range of the laser line scanning sensor. The updated data is determined as an invalid data, in response to the updated data in the data buffer being beyond the measurement range of the laser line scanning sensor. It is determined that scanning of one seam segment of the weld seam has started, in response to multiple valid data being continuously stored the data buffer. It is determined that scanning of the one weld segment of the weld seam has finished, in response to multiple invalid data being continuously stored in the data buffer, and the one seam segment is labeled.

In the embodiment, the coordinate converting the original sampling deviation value to obtain a converted sampling deviation value, and then obtaining a first converted sampling deviation coordinate based on a current position coordinate of a motion mechanism includes steps as follows. A sampling deviation value in a coordinate system of the motion mechanism and a positional value corresponding to the sampling deviation value as the first converted sampling deviation coordinate are obtained. The sampling deviation value in the coordinate system of the motion mechanism is obtained through a formula expressed as follows:

$$Y_{trans} = Y_{ori} + Y_{offset} + Y_{plat}$$

where $Y_{trans}$ represents the sampling deviation value in the coordinate system of the motion mechanism, $Y_{ori}$ represents the original sampling deviation value, which is a deviation of an intersection point of a laser scanning beam from the laser line scanning sensor and the weld seam with respect to a center point of the laser scanning beam from the laser line scanning sensor, $Y_{offset}$ represents an offset distance of the laser line scanning sensor from the galvanometer, and $Y_{plat}$ represents a Y value of the current position coordinate of the motion mechanism. The positional value corresponding to the sampling deviation value is obtained through a formula expressed as follows:

$$X_{trans} = X_{offset} + X_{plat}$$

where $X_{trans}$ represents the positional value corresponding to the sampling deviation value $Y_{trans}$, $X_{offset}$ represents a distance of the laser line scanning sensor relative to the galvanometer, and $X_{plat}$ represents an X value of the current position coordinate of the motion mechanism.

In the embodiment, the preset path is a straight-line path between the motion starting point and the motion ending point.

In the embodiment, the performing, by the galvanometer, a weld seam tracking on the weld seam includes step as follows. The motion trajectory of a center point of the galvanometer is calculated according to a formula expressed as follows:

$$Y_{scan} = Y_{trans-plat} - Y_{plat}$$

where $Y_{scan}$ represents an offset value of the center point of the galvanometer from an origin point of the galvanometer, $Y_{trans-plat}$ represents a sampling deviation value corresponding to a positional value $X_{trans-plat}$ in the data buffer, $X_{trans-plat}$ represents a position value closest to the X value $X_{plat}$ of the current position coordinate of the motion mechanism, and $Y_{plat}$ represents the Y value of the current position coordinate value of the motion mechanism.

In the embodiment, the performing Hermite interpolation using the current position coordinate of the motion mechanism, the first converted sampling deviation coordinate, a corner point coordinate corresponding to a maximum sampling deviation coordinate of the weld seam, an endpoint coordinate of the weld seam, a motion ending point coordinate of the motion mechanism, and a derivative of the current position coordinate of the motion mechanism, a derivative of the first converted sampling deviation coordinate, a derivative of the corner point coordinate corresponding to the maximum sampling deviation coordinate of the weld seam, a derivative of the endpoint coordinate of the weld seam, and a derivative of the motion ending point coordinate of the motion mechanism as interpolation points, thereby obtaining an interpolation function as a motion trajectory includes steps as follows. After he motion mechanism starts moving, the current position coordinate of the motion mechanism, the derivative of the current position coordinate, the first converted sampling deviation coordinate, and the derivative of the first converted sampling deviation coordinates are used as first interpolation points, and then the Hermite interpolation is performed to obtain a first local continuous cubic interpolation function, and the first local continuous cubic interpolation function is used as the motion trajectory of the motion mechanism for a current phase. When the motion reaches the first converted sampling deviation coordinate, the first converted sampling deviation coordinate, the derivative of the first converted sampling deviation coordinate, the endpoint coordinate of the weld seam, the derivative of the endpoint coordinate of the weld seam, the corner point coordinate corresponding to the maximum sampling deviation coordinate of the weld seam, and the derivative of the corner point coordinate corresponding to the maximum sampling deviation coordinate of the weld seam are used as second interpolation point, and then the Hermite interpolation is performed based on the second interpolation points to obtain a local continuous quintic interpolation function, and the local continuous quintic interpolation function is used as the motion trajectory of the motion mechanism for the current phase. When the motion mechanism reaches the endpoint coordinate of the weld seam, the endpoint coordinate of the weld seam, the derivative of the endpoint coordinate of the weld seam, the motion ending point coordinate of the motion mechanism, and the derivative of the motion ending point coordinate of the motion mechanism are used as third interpolation points, and then the Hermite interpolation is performed based on the third interpolation points to obtain a second local continuous cubic interpolation function, and the second local continuous cubic interpolation function is used as the motion trajectory of the motion mechanism for the current phase. The first converted sampling deviation coordinate refers to a latest converted sampling deviation coordinate in the data buffer at a current moment. The corner point coordinate corresponding to the maximum sampling deviation coordinate of the weld seam refers to a coordinate obtained by subtracting the processing range of the galvanometer from the maximum sampling deviation coordinate.

In the embodiment, the corresponding motion trajectories of the center point of the galvanometer are obtained based on the first local continuous cubic interpolation function, the local continuous quintic interpolation function, and the second local continuous cubic interpolation function, respectively.

A collaborative seam tracking platform based on laser line scanning sensing includes a laser line scanning sensor, an industrial control computer, a motion mechanism, a galvanometer, and a fiber laser. The fiber laser is configured to generate a laser beam and transmit the laser beam to the galvanometer through an optical fiber. The galvanometer is connected to an end of the motion mechanism and is positioned ahead of the motion mechanism along a welding direction. The laser line scanning sensor is located in front of the galvanometer, is configured to collect weld seam deviation values at a pre-set sampling frame rate and send the weld seam deviation values to the industrial control computer. The industrial control computer is configured to calculate tracking control quantities based on a weld seam tracking strategy. After the calculation is completed, the industrial control computer is configured to send the tracking control quantities to the motion mechanism and the galvanometer to achieve coordinated tracking control of the motion mechanism and the galvanometer.

The above is only the specific embodiments of the disclosure, but the scope of protection of the disclosure is not limited to this. Any changes or replacements that can be easily thought of by those skilled in the art within the technical scope disclosed in the disclosure should be included in the scope of protection of the disclosure. Therefore, the scope of protection of the disclosure should be based on the scope of protection of the claims.

What is claimed is:

1. A collaborative weld seam tracking method based on laser line scanning sensing, comprising:
    during a welding process, implementing the following steps:
        scanning, by using a laser line scanning sensor, a weld seam to obtain an original sampling deviation value;
        coordinate converting the original sampling deviation value to obtain a converted sampling deviation value, and then obtaining a first converted sampling deviation coordinate based on a current position coordinate of a motion mechanism;
        in response to an absolute difference between the converted sampling deviation value and a position value of a projection point of the converted sampling deviation value on a preset path is less than a processing range of a swing galvanometer, performing, by the swing galvanometer, a weld seam tracking on the weld seam; and
    in response to the absolute difference between the converted sampling deviation value and the position value of the projection point of the converted sampling deviation value on the preset path is greater than or equal to the processing range of the swing galvanometer, performing Hermite interpolation using the current position coordinate of the motion mechanism, the first converted sampling deviation coordinate, a corner point coordinate corresponding to a maximum sampling deviation coordinate of the weld seam, an endpoint coordinate of the weld seam, a motion ending point coordinate of the motion mechanism, a derivative of the current position coordinate of the motion mechanism, a derivative of the first converted sampling deviation coordinate, a derivative of the corner point coordinate corresponding to the maximum sampling deviation coordinate of the weld seam, a derivative of the endpoint coordinate of the weld seam, and a derivative of the motion ending point coordinate of the motion mechanism as interpolation points, thereby obtaining an interpolation function as a motion trajectory of the motion mechanism.

2. The collaborative weld seam tracking method based on laser line scanning sensing as claimed in claim 1, wherein before the welding process, the collaborative weld seam tracking method comprises:
    sequentially disposing the laser line scanning sensor and the swing galvanometer along a welding direction on the motion mechanism configured for welding the weld seam;
    setting a data buffer, and determining the processing range of the swing galvanometer based on a processing area of the swing galvanometer; and
    setting a motion starting point of the motion mechanism and a motion ending point of the motion mechanism along the welding direction.

3. The collaborative weld seam tracking method based on laser line scanning sensing as claimed in claim 2, wherein the sequentially disposing the laser line scanning sensor and the swing galvanometer along a welding direction on the motion mechanism configured for welding the weld seam comprises:

disposing the laser line scanning sensor to make a laser scanning beam of the laser line scanning sensor ahead of the swing galvanometer by a first distance along the welding direction, setting a measurement range of the laser line scanning sensor, calibrating the laser line scanning sensor, and adjusting the laser scanning beam of the laser line scanning sensor to make the weld seam being in the measurement range of the laser line scanning sensor;

wherein the first distance is greater than a mapping distance of the weld seam, and the mapping distance is a maximum value of projected lengths of multiple weld seam segments contained in the weld seam in the welding direction.

4. The collaborative weld seam tracking method based on laser line scanning sensing as claimed in claim 3, wherein the scanning, by using a laser line scanning sensor, a weld seam to obtain an original sampling deviation value of the weld seam further comprises:

storing the original sampling deviation value in the data buffer, as updated data;

determining the updated data as valid data, in response to the updated data in the data buffer being in the measurement range of the laser line scanning sensor;

determining the updated data as invalid data, in response to the updated data in the data buffer being beyond the measurement range of the laser line scanning sensor;

determining that scanning of one seam segment of the weld seam has started, in response to multiple valid data being continuously stored the data buffer; and determining that scanning of the one weld segment of the weld seam has finished, in response to multiple invalid data being continuously stored in the data buffer, and labeling the one seam segment.

5. The collaborative weld seam tracking method based on laser line scanning sensing as claimed in claim 1, wherein the coordinate converting the original sampling deviation value to obtain a converted sampling deviation value, and then obtaining a first converted sampling deviation coordinate based on a current position coordinate of a motion mechanism comprises:

obtaining a sampling deviation value in a coordinate system of the motion mechanism and a positional value corresponding to the sampling deviation value as the first converted sampling deviation coordinate, wherein the sampling deviation value in the coordinate system of the motion mechanism is obtained through a formula expressed as follows:

$$Y_{trans} = Y_{ori} + Y_{offset} + Y_{plat}$$

where $Y_{trans}$ represents the sampling deviation value in the coordinate system of the motion mechanism, $Y_{ori}$ represents the original sampling deviation value, which is a deviation of an intersection point of a laser scanning beam from the laser line scanning sensor and the weld seam with respect to a center point of the laser scanning beam from the laser line scanning sensor, $Y_{offset}$ represents an offset distance of the laser line scanning sensor from the swing galvanometer, and $Y_{plat}$ represents a Y value of the current position coordinate of the motion mechanism;

wherein the positional value corresponding to the sampling deviation value is obtained through a formula expressed as follows:

$$X_{trans} = X_{offset} + X_{plat}$$

where $X_{trans}$ represents the positional value corresponding to the sampling deviation value $Y_{trans}$, $X_{offset}$ represents a distance of the laser line scanning sensor relative to the swing galvanometer, and $X_{plat}$ represents an X value of the current position coordinate of the motion mechanism.

6. The collaborative weld seam tracking method based on laser line scanning sensing as claimed in claim 2, wherein the preset path is a straight-line path between the motion starting point and the motion ending point.

7. The collaborative weld seam tracking method based on laser line scanning sensing as claimed in claim 6, wherein the performing, by the swing galvanometer, a weld seam tracking on the weld seam comprises:

calculating a motion trajectory of a center point of the swing galvanometer according to a formula expressed as follows:

$$Y_{scan} = Y_{trans\text{-}plat} - Y_{plat}$$

where $Y_{scan}$ represents an offset value of the center point of the swing galvanometer from an origin point of the swing galvanometer, $Y_{trans\text{-}plat}$ represents a sampling deviation value corresponding to a positional value $X_{trans\text{-}plat}$ in the data buffer, the positional value $X_{trans\text{-}plat}$ represents a position value closest to the X value $X_{plat}$ of the current position coordinate of the motion mechanism, and $Y_{plat}$ represents the Y value of the current position coordinate of the motion mechanism.

8. The collaborative weld seam tracking method based on laser line scanning sensing as claimed in claim 7, wherein the performing Hermite interpolation using the current position coordinate of the motion mechanism, the first converted sampling deviation coordinate, a corner point coordinate corresponding to a maximum sampling deviation coordinate of the weld seam, an endpoint coordinate of the weld seam, a motion ending point coordinate of the motion mechanism, and a derivative of the current position coordinate of the motion mechanism, a derivative of the first converted sampling deviation coordinate, a derivative of the corner point coordinate corresponding to the maximum sampling deviation coordinate of the weld seam, a derivative of the endpoint coordinate of the weld seam, and a derivative of the motion ending point coordinate of the motion mechanism as interpolation points, thereby obtaining an interpolation function as a motion trajectory comprises:

after the motion mechanism starts moving, using the current position coordinate of the motion mechanism, the derivative of the current position coordinate, the first converted sampling deviation coordinate, and the derivative of the first converted sampling deviation coordinate as first interpolation points, and then performing Hermite interpolation to obtain a first local continuous cubic interpolation function, and using the first local continuous cubic interpolation function as the motion trajectory of the motion mechanism for a current phase;

when the motion mechanism reaches the first converted sampling deviation coordinate, using the first converted sampling deviation coordinate, the derivative of the first converted sampling deviation coordinate, the endpoint coordinate of the weld seam, the derivative of the endpoint coordinate of the weld seam, the corner point coordinate corresponding to the maximum sampling deviation coordinate of the weld seam, and the derivative of the corner point coordinate corresponding to the maximum sampling deviation coordinate of the weld seam as second interpolation points, and then performing Hermite interpolation based on the second interpolation points to obtain a local continuous quintic interpolation function, and using the local continuous quintic interpolation function as the motion trajectory of the motion mechanism for the current phase; and when the motion mechanism reaches the endpoint coordinate of the weld seam, using the endpoint coordinate of the weld seam, the derivative of the endpoint coordinate of the weld seam, the motion ending point coordinate of the motion mechanism, and the derivative of the motion ending point coordinate of the motion mechanism as third interpolation points, and then performing Hermite interpolation based on the third interpolation points to obtain a second local continuous cubic interpolation function, and using the second local continuous cubic interpolation function as the motion trajectory of the motion mechanism for a current phase;

wherein the first converted sampling deviation coordinate refers to a latest converted sampling deviation coordinate in the data buffer at a current moment; and wherein the corner point coordinate corresponding to the maximum sampling deviation coordinate of the weld seam refers to a coordinate obtained by subtracting the processing range of the swing galvanometer from the maximum sampling deviation coordinate.

9. The collaborative seam tracking method based on laser line scanning sensing as claimed in claim 8, wherein the corresponding motion trajectories of the center point of the swing galvanometer are obtained based on the first local continuous cubic interpolation function, the local continuous quintic interpolation function, and the second local continuous cubic interpolation function, respectively.

10. A collaborative weld seam tracking platform based on laser line scanning sensing, comprising:

a laser line scanning sensor, an industrial control computer, a motion mechanism, a swing galvanometer, and a fiber laser;

wherein the fiber laser is configured to generate a laser beam and transmit the laser beam to the swing galvanometer through an optical fiber; the swing galvanometer is connected to an end of the motion mechanism and is positioned ahead of the motion mechanism along a welding direction, and the swing galvanometer is configured to collect weld seam deviation values at a pre-set sampling frame rate and send the weld seam deviation values to the industrial control computer; the industrial control computer is configured to calculate tracking control quantities based on a weld seam tracking strategy; after the calculation is completed, the industrial control computer is configured to send the tracking control quantities to the motion mechanism and the swing galvanometer to achieve coordinated tracking control of the motion mechanism and the swing galvanometer.

* * * * *